ary, or Firm—James R. Hoatson, Jr.;
United States Patent [19]

Hunter et al.

[11] 3,969,548

[45] July 13, 1976

[54] METHOD FOR FORMING A SEMI-PERMEABLE STRIP

[75] Inventors: Jack A. Hunter, Long Grove, Ill.; Kenneth E. Anderson, Rancho Bernardo, Calif.

[73] Assignee: Universal Oil Products Company, Des Plaines, Ill.

[22] Filed: Nov. 21, 1974

[21] Appl. No.: 525,909

Related U.S. Application Data

[62] Division of Ser. No. 323,614, Jan. 15, 1973, Pat. No. 3,909,418.

[52] U.S. Cl. ............................... 427/244; 427/258; 427/245; 427/289; 427/293; 427/358; 55/158
[51] Int. Cl.² ......................................... B05D 5/00
[58] Field of Search .................. 427/289, 293, 244; 210/321 R, 346, 433 R, 433 M; 55/16, 158; 118/37, 221, 222

[56] References Cited

UNITED STATES PATENTS

| 2,597,907 | 5/1952 | Steiner et al. | 55/158 |
| 3,133,132 | 5/1964 | Loeb et al. | 210/23 X |
| 3,401,798 | 9/1968 | Hyrop | 210/346 X |
| 3,494,469 | 2/1970 | Kohl et al. | 210/346 X |
| 3,508,994 | 4/1970 | Hyrop | 210/321 X |
| 3,610,418 | 10/1971 | Calderwood | 210/336 X |
| 3,623,610 | 11/1971 | Olsen et al. | 210/336 X |
| 3,661,721 | 5/1972 | Rodgers | 55/158 X |
| 3,735,562 | 5/1973 | Mousseau, Jr. et al. | 55/158 |
| 3,767,502 | 10/1973 | Ishii et al. | 210/321 R X |
| 3,837,146 | 9/1974 | Faure et al. | 55/158 |

*Primary Examiner*—Ronald H. Smith
*Assistant Examiner*—Evan K. Lawrence
*Attorney, Agent, or Firm*—James R. Hoatson, Jr.; William H. Page, II; Philip T. Liggett

[57] ABSTRACT

A method of forming membrane covered laminate strips of a desired predetermined length from an elongated porous strip wherein said strip is impregnated at spaced predetermined sections with a fluid seal material to preclude fluid flow through such sections and is also coated on each face with a suitable membrane forming coating material to thereby form a laminate strip suitable for reverse osmosis and/or ultrafiltration usage. The resulting laminate strip is provided with a punched hole in a portion of the impregnated section to effect a fluid passageway opening therethrough and, additionally, is cut transversely through an intermediate portion of such section to result in the formation of a multiplicity of predetermined length laminate strips. A plurality of stacked strips, with the punched hole positions staggered in adjacent strips, or groups of strips, provides a simplified form of apparatus with an elongated serpentine flow path therethrough for separating the constituents of a fluid feed stream.

6 Claims, 7 Drawing Figures

METHOD FOR FORMING A SEMI-PERMEABLE STRIP

This application is a division of our application Ser. No. 323,614, filed Jan. 15, 1973 now U.S. Pat. No. 3,909,418.

The present invention is directed to the use of stacked, specially formed, and punched laminate strips to provide a simplified form of semi-permeable membrane separation apparatus.

The invention is also directed to a continuous method of forming membrane covered laminate strips of a desired predetermined length from an elongated porous strip.

The use of semi-permeable membranes in ultrafiltration and reverse osmosis operations, as for example in obtaining fresh water from sea water or from brackish water, is now well known and no detailed explanation of the use of membranes, or of the general nature of the membranes, is believed necessary at this time. Membranes can be of a tubular or hollow-fiber type, or they may be generally flat and supported on or over a suitable porous support member. A membrane or membrane layer on a laminate member must be thin and have the necessary property of selectively permitting a desired fluid, such as for example water, to be transmitted therethrough more rapidly than the dissolved salts in the water. The fluid stream to be treated must be under pressure to force the desired constituent through the membrane and, as a result, the membrane must be adequately supported to withstand the sustained pressure operation.

Various types of support materials can be used where the membranes are to be applied directly to one or more faces of the support to form a laminate; however, preferably, the support material will be one which has pressure resisting strength along with high porosity so as to preclude undue pressure losses. It is, of course, not intended to limit the present invention to any one type of membrane material or to the use of any one type of porous support material. In a still further aspect, the present invention is not to be limited to the making of laminate strips or to separation units which are to be used for merely one type of separation operation. For example, present types of strips and resulting units may well be used for lactose and protein separations from whey as well as for fresh water recovery from a saline water.

It is thus a principal object of the present invention to provide an improved form of membrane laminate which can be used to advantage in a separation unit accommodating a serpentine flow path for the stream being treated.

It is also considered a principal object of the present invention to provide a rapid continuous system for producing laminate-form, membrane-containing strips which can be stacked or otherwise assembled into a reverse osmosis or ultrafiltration separation unit utilizing thin channel flow.

In one embodiment, the present invention provides a continuous method for forming a laminate member suitable for stacking and for separating the constituents of a fluid feed material which can be passed over the member, which comprises: (a) drawing a thin, elongated strip of porous filler material through an impregnation zone and effecting penetration with a fluid seal material through spaced sections of said strip, whereby there can be no subsequent fluid flow therethrough; (b) continuing to draw said strip through a coating zone and into contact with a membrane forming coating solution to form a semi-permeable membrane on each side of said strip; (c) passing the thusly coated strip into a controlled temperature drying zone, thereby forming a resulting laminate strip with spaced, sealed sections; (d) cutting at least one hole in said strip through the spaced and sealed sections; and (e) additionally, transversely cutting said elongated strip through the spaced and sealed sections at a spaced distance from any holes therein to provide resulting separate laminate strips each of which has fluid sealing material through the porous filler for both end portions thereof and a fluid passageway hole through one end portion.

Additional treating may incorporate the introduction of the coated, punched and possibly cut lengths of laminate into a solvent removal bath at a controlled temperature to effect the formation of the desired asymmetric membrane structure. Also, there may be a continuing passage of the resulting laminate strip, or strips, into a controlled temperature bath, or a series of baths, to insure a final adjustment of membrane separating characteristics.

In another embodiment, the invention provides an apparatus employing semi-permeable means for separating the constituents of a fluid feed material, which comprises in combination, (a) a plurality of stacked laminate members; (b) each laminate member having semi-permeable membranes each side of a central porous filler material which permits fluid flow therethrough; (c) spacing means in association with edge portions of each laminate thereby forming internal fluid channels between said plurality of stacked laminate members for the feed material flow; (d) an impregnating fluid seal material embodied into the end portions of the porous filler material for each of said laminate members to prevent fluid flow therefrom; (e) a passageway through at least one sealed end portion of each member and such passageways in the plurality of members being positioned to effect a resulting extended length fluid flow path provided through said internal fluid channels between members; (f) fluid feed inlet means to one end of said extended length flow path and fluid outlet means from the opposing end thereof; and (g) a separated fluid collection means in communication with the unsealed porous and longitudinal edge portions of each laminate to obtain a fluid constituent which had passed through the semi-permeable membranes of the laminates to the porous filler material.

The porous support material, which is used in making the laminate strips, may be of a standard or conventional form of porous material that is premanufactured into long flat strips which can, in turn, be supplied in a roll form. Alternatively, the porous strip may be prepared as a part of an uninterrupted manufacturing procedure carried out just ahead of the membrane coating and the laminating forming stages in an overall operation. Where the porous material is to be formed, it may, for example, be prepared from micro-spherical particles that are heated and pressed by suitable forming rolls into a thin flat strip of uniform thickness or of a cross-section with thickened edges where so desired. Typically, the porosity of the support strip structure can be controlled by various aspects including types of porous materials as well as by temperature and the degree of pressure which is produced by the strip forming rolls. Generally, it is desirable that the porous filler or support structure will have a very smooth surface and approximately 50% void area throughout the entire porous cross-section of the material.

With respect to the membrane coating material, such coating may comprise cellulose acetate, or other polymer which will suitably provide a semi-permeable membrane with a desired penetration characteristic to in turn carry out a desired separation process. Preferably, the membrane coating will be applied to each face of the porous strip as it is automatically pulled through a membrane coating zone and through a controlled drying zone. As the strip is pulled through the coating section, it should be completely wetted with the membrane forming solution and then subsequently pulled through suitable wiping blades or other means which will provide a controlled removal of excess membrane solution and leave a continuous, even film of the desired solution on the porous support structure at a desired thickness. It may also be desirable that there be a suitable controlled solvent vapor atmosphere which will preclude the rapid drying of the membrane coating material and in turn eliminate inadvertent formation and/or deposition of flakes of the hardened membrane that could effect the performance of the finished product. In a subsequent section, there will be utilized the movement of clean air at a controlled temperature which will effect the drying and setting of the membrane surface and, if appropriate, the utilization of solvent removal tanks and heat treating baths to insure obtaining the desired semi-permeable characteristics.

In accordance with the present invention, there will be spaced portions of the porous support structure which will have total sealing with respect to fluid flows under pressures by virtue of having a sealing solution impregnated through the entire thickness of the strip. Various types of resins or polymers may be used to advantage to effect the impregnation and sealing of the strip material at spaced points throughout its length; however, a desirable process operation may make use of the membrane forming material such as the cellulose acetate or other membrane coating material as the impregnating agent. In other words, the cellulose acetate under pressure could be applied to spaced portions of the porous strip in order to effect total impregnation thereof prior to having the membrane coating step which will merely effect the surface coating of each side of the strip to form the resulting laminate. The impregnated section may be predried or it may be passed on through surface coating stages and subsequent drying stages without a preliminary drying. One advantage to utilizing the same type of material for effecting the impregnation of the sealed sections as is used for the surface coatings resides in the fact that the surface coating will have a surface area which is compatible with respect to adherence in effecting a continuous rapid manufacturing procedure in forming laminate strips. A resulting coated laminate strip, with the spaced sealed portions, will subsequently be subjected to a punching operation and a cutting step which will effect the formation of one or more fluid passageway holes in a sealed end portion of a laminate strip. The cutting operation will, of course, effect the cutting of a continuous elongated strip into laminate strips of a desired predetermined length and such cutting will be correlated with the distances between spaced impregnated portions of the strips such that there is a cutting through of each of the impregnated sections at a point relatively close to a punching or punched area whereby there are a plurality of predetermined length strips each having impregnated and sealed end portions as well as a hole through one end portion. Each of the resulting laminate strips may then be utilized for stacking purposes in a separation unit to provide for the accommodation of a continuously flowing feed stream which can pass in a serpentine flow path through the processing unit.

In connection with the use of a plurality of laminate strips, such as produced in accordance with the present invention, there are several variations with respect to combining them into particular separation apparatus. For example, a plurality of stacked laminate strips can be maintained within a housing or chamber where each laminate strip is spaced one from another by the use of suitable spacers or separator members which will in turn provide resulting shallow or thin fluid flow channels to accommodate the feed stream to be separated. The material that will permeate through the membrane is withdrawn from the porous edge portions of each of the stacked laminate members while the concentrated material in the shallow flow channels on the high pressure side of the membrane will continue on through the continuous serpentine flow path. In another aspect, the laminate members may be formed by placing a membrane coating over an elongated porous strip which has thickened edge portions which, after processing through the impregnating, coating, perforating and cutting steps, will result in predetermined length laminate members with thick edges that can be pressed directly adjacent each other in a stacked manner and which can eliminate the need of other spacers or separator means to in turn provide a fluid flow channel between laminate members.

DESCRIPTION OF THE DRAWINGS

Reference to the accompanying drawings and the following descriptions thereof will serve to further illustrate and amplify the method of the present invention in providing means for continuously making laminate strips, as well as means for utilizing the special forms of the laminate strips in a stacked manner to provide a desirable form of fluid stream separating unit.

Figure 1:
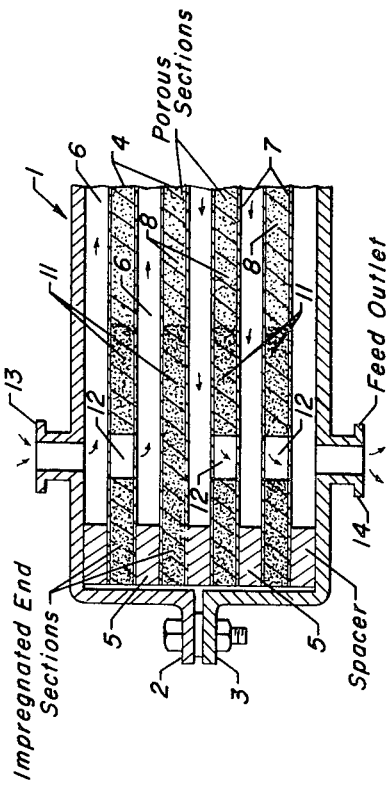
FIGS. 1 and 2 of the drawing indicate diagrammatically and respectively a cross-sectional view and a partial sectional elevational view of a stacked form of fluid separation.
Figure 2:
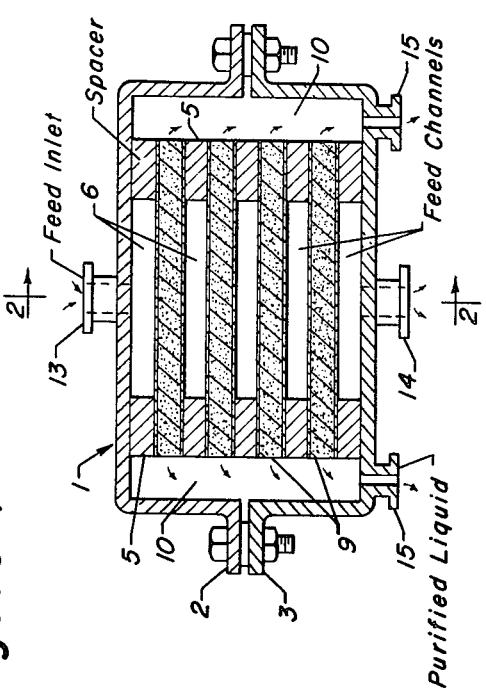

Referring now particularly to FIGS. 1 and 2 of the drawing, there is indicated a closed housing or chamber 1 formed of upper and lower portions with the respective flange sections 2 and 3 such that there may be the tight clamping of the two sections to hold internally encased laminate members and spacer members. In this instance, there are a plurality of stacked spaced apart laminate members 4 and a plurality of spacers 5 which are used between laminate members 4, as well as adjacent the walls of the housing 1, to thus provide a plurality of spaced apart fluid feed channels 6 within the chamber 1. Each laminate member 4 will, of course, have a suitable membrane coating 7 on a top and bottom portion thereof, but not on each edge portion, whereby fluid may pass through each of the membranes from each feed channel 6 and into the porous substrate material 8 for each laminate strip and then pass out unsealed edge portions 9 to in turn pass into fluid collecting sections 10 within chamber 1.

As best shown in FIG. 2, and in accordance with the present invention, each laminate member 4 will have each end portion of the porous strip portion 8 impregnated with a fluid sealing material so as to preclude end-wise fluid flow through each porous section; even under relatively high pressure conditions. In this instance, the sealed and impregnated sections are illustrated by the darker shaded sections at 11 which, of course, result in precluding fluid flow from either the end or a side for each impregnated end portion of each laminate member. Also as best shown in FIG. 2, there are punched hole means 12 through the laminate members 4 such that there will be a parallel flow, as well as a serpentine flow pattern, for the fluid stream passing through the separation unit from one end to the other. In other words, where a feed stream enters inlet means 13 at the top of chamber 1 and passes to the two upper fluid feed channels 6, there is a parallel and longitudinal flow of the feed stream to an opposing end of the separation unit, then passage down through suitable openings such as 12 (but not shown), to the next lower layers of feed channel 6, then a parallel return of fluid flow to a next lower set of openings 12 and thence outwardly or to a next lower set of feed channels, etc., in the case of a large number of stacked laminates, until the feed stream reaches the lower end of the chamber and is discharged by way of feed stream outlet 14. The feed material entering the unit by way of inlet 13 is, of course, under pressure to carry the feed stream through the entire separation unit and suitable to force a desired component through each membrane 7 of each laminate strip 4 into the porous substrate 8 whereby the resulting solution can pass laterally to the long unsealed edges 9 and into the low pressure solution compartment 10 and thence pass outwardly by way of outlet 15. The arrangement of FIG. 2 incorporates parallel flow, as well as serpentine flow; however, it is not intended to limit the present invention, or unit design, to any one type of extended flow path as various arrangements can well be used. There could be parallel flow through several adjacent channels in one direction and then a reversal to have parallel fluid flow through the next several adjacent channels.

Figure 3:
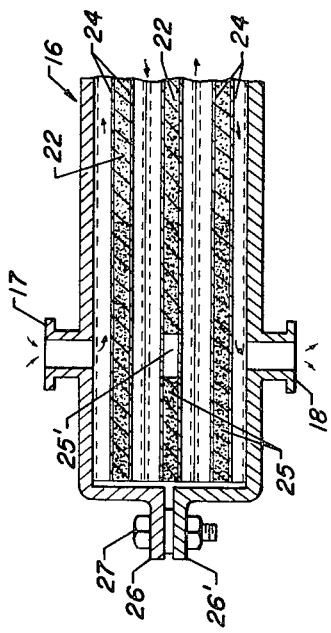
FIGS. 3 and 4 of the drawing show diagrammatically and respectively a cross-sectional view and a partial sectional elevational view of a stacked form of fluid separation unit, where each laminate member has a thickened longitudinal edge portion to provide fluid feed channels without the need of spacer members.
Figure 4:
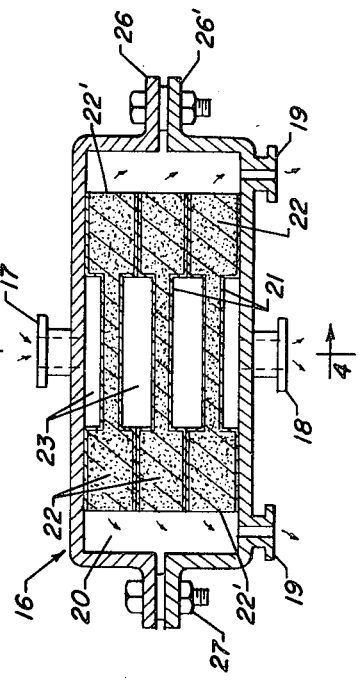

In connection with FIGS. 3 and 4 of the drawing, there is illustrated a separator unit similar to that shown in FIGS. 1 and 2 except that each of the laminate members are provided with thickened edge portions and there is the elimination of separate spacer means. Specifically, there is indicated a housing or chamber 16 with a feed inlet means 17 and a feed outlet means 18 and purified liquid outlets 19 connected with the low pressure separated liquid compartments 20. The plurality of stacked laminate members 21 may be made in a manner similar to the laminate members 4 of FIGS. 1 and 2 except that in the present embodiment each member 21 has a thickened edge portion for the porous support 22 whereby the stacking of the plurality of adjacent members will result (without spacers) in a plurality of spaced apart feed channels 23.

Each laminate member 21 will have top and bottom surface coatings 24 of cellulose acetate or other membrane material adapted to accommodate the particular separation process to be carried out. Also, as provided in connection with the previously described forms of laminates, each laminate will have porous longitudinal edge portions 22' capable of permitting the passage of fluid carrying through the membrane surface to in turn flow into the liquid collection compartments 20 and thence through the outlets 19. Still further, each laminate member will have each end portion for the porous supporting structure 22 sealed and impregnated with a suitable sealing material which will preclude the passage of the separated solution through an end portion of the substrate. Diagrammatically, the sealed end portions for the laminates are indicated by the more darkly shaded area 25, as best shown in FIG. 4 of the drawing. There is also indicated in this FIG. 4 the utilization of a hole, or passageway, 25' through an alternate end portion of each laminate member 21 whereby there is a resulting serpentine flow for the feed material entering by way of inlet means 17 and being discharged by way of outlet means 18.

It will be noted that the thickened edge portions for each of the stacked laminate members 21, as best shown in FIG. 3, will permit the stacking of a plurality of the laminates into a given housing or chamber such as 16 and the clamping of the latter tightly against such stacking of laminates to result in the desired separation unit capable of accommodating a pressurized fluid inlet stream which will undergo the reverse osmosis or ultrafiltration separation within the unit. Diagrammatically, flange means 26 and 26' for the respective portions of housing 16, together with bolt means 27, will permit the clamping of the laminates within the chamber.

Figure 5:
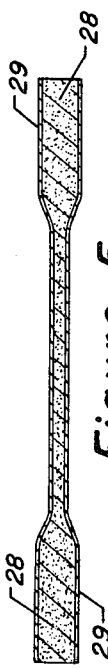
FIG. 5 of the drawing indicates diagrammatically a sectional view through one form of laminate member having thickened edge portions.

It is not intended to limit the present invention to any one form of laminate strip inasmuch as the strips may have varying cross-sectional shapes as well as various coatings to serve as semi-permeable membranes in a particular separation procedure. It may be noted that the laminate members 21 in FIG. 3 have a sharp transition, or shoulder type construction, from a thin intermediate section to relatively thick edge portions, such that the latter can eliminate the need of spacer means when stacking laminates in a confined chamber. However, as best shown in FIG. 5 of the drawing, there may be made a laminate member where the porous strip or substrate portion 28 has a gradual tapering to thickened edge portions such that a plurality of the resulting laminates with surface coatings 29 can be stacked without the need of spacer means, as were required in FIG. 1 of the drawing. Still other cross-sectional configurations may well be utilized to accomplish a thickened edge type of laminate strip and it is not believed necessary to illustrate the variety of types of cross-sections that might be utilized.

Figure 6:
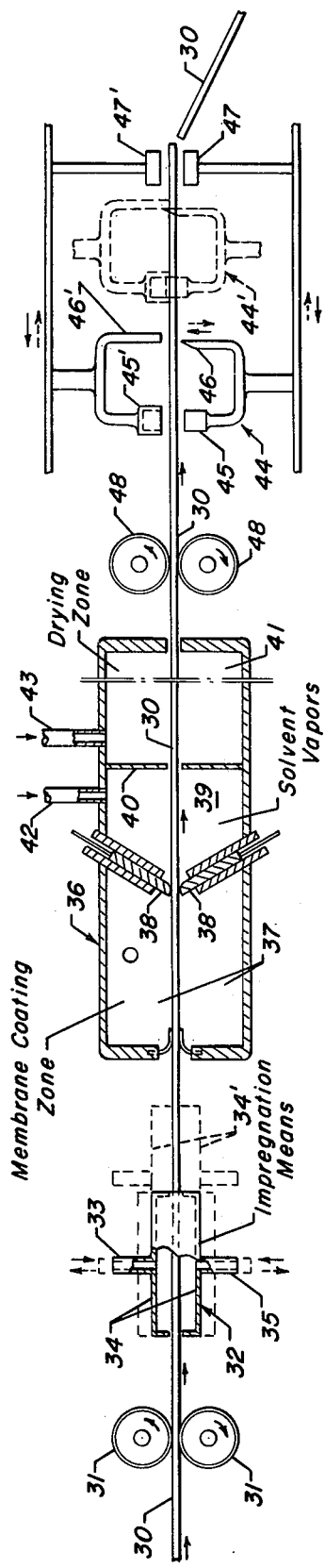
FIG. 6 of the drawing shows diagrammatically a plurality of stages for contacting and treating an elongated porous strip to result in a continuous method of manufacturing predetermined length laminate strips.

In accordance with one aspect of the present invention, where there is a means provided for continuously producing a plurality of laminate strips of predetermined length from the continuous treating of an elongated porous strip, reference may be made to FIG. 6 of the drawing. This figure shows in a diagrammatic manner the passage of a thin elongated substrate strip 30 through a plurality of processing stages. More specifically, there is indicated the passage of the thin strip of porous material 30 through roller means 31 to a sealing impregnation stage 32 where a suitable sealing fluid material is introduced under pressure by way of inlet means 33 into a two-part, clamp-on housing arrangement 34 and then discharged by way of outlet means 35. For example, the housing means 34 may be made with retractable and movable portions whereby there is a clamping onto the moving strip 30 for a period of time to effect suitable penetration of a sealing material into and through the porous strip 30 for a spaced section thereof. The sealing compound may be the same material in solution form from which the membrane coating will be formed, although in certain instances other polymers, resins or fluid sealing materials might well be utilized. By virtue of dotted lines 34', there is indicated movement of the impregnating means along with the movement of the strip 30, with such movement being accomplished by automated machinery which can clamp to or otherwise make a tight junction with the strip 30 as the latter moves along to undergo a continuous processing operation. The impregnating unit 34 is thus retractable as well as translatable in order to give movement correlating with the strip movement whereby there is the periodic clamping against the strip to result in spaced portions of impregnated areas in strip 30.

Following the impregnation stage, moving strip 30 enters a housing 36 in turn accommodating a membrane coating fluid 37 and adjustable wiper means 38 such that a desired membrane coating film is applied to both the upper and lower surfaces of strip 30 during its passage through the chamber 36. Additionally, there is indicated a solvent vapor zone 39 downstream from the vapor means 38 so as to preclude rapid drying of the coating on strip 30 prior to its passing through baffle means 40 into drying zone 41. Solvent vapor is indicated diagrammatically as being introduced by way of inlet means 42, while dry, controlled temperature air is shown entering chamber 36 by way of inlet means 43. The resulting membrane coated strip 30 having the spaced fully impregnated and sealed areas then passes from chamber 36 to a cutting zone where there is the punching of at least one hole through each spaced impregnated section and the transverse cutting of the entire strip to form a plurality of separated laminate strips. Specifically, there is indicated diagrammatically the use of a retractable and longitudinally translatable hole punching and transverse cutting device at 44, and unit 44 has opposing punch members 45 and 45', as well as opposing knife portions 46 and 46'. Unit 44 additionally is provided with strip clamping members 47 and 47' to assist in holding the strip in place while there is the longitudinal movement of the strip 30 and the cutting action for the hole punching and knife cutting portions. Diagrammatically, the dotted line portion 44' shows that the automated cutting apparatus may well be longitudinally translatable to move along at the same rate of speed with the movng strip 30, as well as reciprocating to effect cuttings. Inasmuch as the present drawing is purely diagrammatic, the power supply means and the various guide means that may be necessary for pulling and/or pushing the moving strip 30 through the plurality of stages have not been shown. The use of one set of additional rollers is shown at 48, which contact only the non-working edges of strip 30; also clamp means, guide means, and the like, which may be necessary in connection with automated equipment, will be obvious to those skilled in providing for the movement of strip type materials in processing plants.

Figure 7:
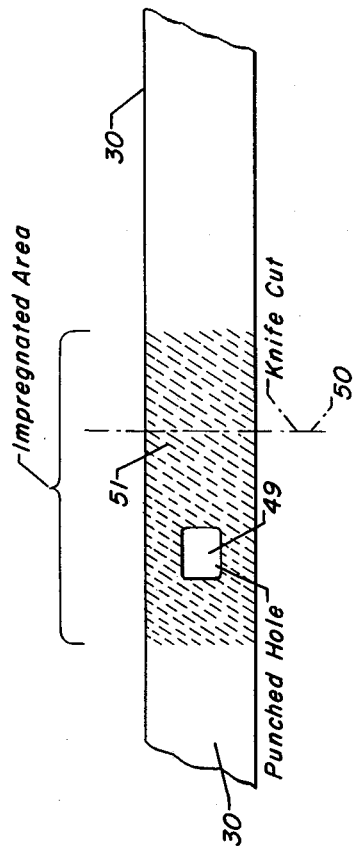
FIG. 7 of the drawing is a diagrammatic plan view of a portion of a treated porous strip to illustrate the cutting of the strip in the impregnated and sealed area adjacent a punched section in order to provide predetermined length laminate strips each of which will have impregnated and sealed end portions, as well as a puched hole in one sealed end portion of each strip.

In order to further clarify the punching and cutting operations as effected by means 44, there may be reference to FIG. 7 of the drawing where the shaded portion indicates a spaced impregnated section 51 along the length of the strip 30 and the relation of a punched hole, such as 49, with respect to a knife cutting position 50, whereby the cut is to be made through a mid-portion of the impregnated area 51 at a spaced distance from the punched hole 49 to then result in a plurality of resulting laminate members of desired predetermined length where each laminate member will have an impregnated portion at each end precluding fluid flow therefrom as well as a punched hole at one end portion. The punched hole through one end portion it utilized to effect passage of a fluid stream from one channel to a next adjacent channel when the laminate members are arranged in a stacked manner such as shown in FIGS. 2 and 4.

It is to be reiterated that the arrangement of FIG. 6 is diagrammatic and that various types of equipment and processing means to effect the operational steps may be utilized in the contacting or treating of the porous strip 30 for each stage of the continuous manufacturing procedure. For example, and for simplicity in illustrating the procedure, there has been no supply source shown for the air entering inlet 43 to chamber 46, or source of solvent vapor for inlet 42, and the like. Actually, the temperature of the heated stream entering 43 for the drying zone 41 will necessarily be correlated with the type of membrane coating being supplied on the porous substrate 30 to produce a desired laminate and will vary in accordance with the type of coating being utilized. In other words, a cellulose acetate coating may well require a different temperature and different drying time than that required for other polymer coatings. Also, the type of solvent vapor entering 42 will necessarily vary in accordance with the type of membrane coating being applied to each side of the porous substrate 30 from zone 37. Preferably, the wiper blades at 38 will be regulatable as to pressure and spacing, as for example by pneumatic control means, whereby a controlled thickness of film will be retained on the strip 30 as it leaves the coating zone on its way to the drying zone 41.

In still another stage as heretofore briefly described, although not shown in the drawing, there may be the provision of water quenching or heat treatments following the punching and cutting operation such that each separate laminate member may pass through one or more controlled temperature baths where the membrane coatings can be soaked for prescribed periods of time to give the desired separation characteristics.

Still further, in accordance with the teachings set forth in connection with FIGS. 3, 4 and 5 of the drawing, it is to be noted that strip 30 need not necessarily be of a uniform cross-sectional thickness inasmuch as a preformed strip may be supplied with thickened edge portions whereby resulting cut laminate members of predetermined length can be stacked in a given chamber and clamped therein to thereby form open channels for a feed stream without the need of separate spacer members between each adjacent laminate member.

We claim as our invention:

1. A continuous method for forming a member suitable for stacking and for separating the constituents of a fluid feed material which can be passed over the member, which comprises:
   a. moving a thin, elongated strip of porous filler material through an impregnation zone and effecting penetration with a fluid seal material through spaced sections of said strip, whereby there can be no subsequent fluid flow therethrough;
   b. continuing to draw said strip through a coating zone and into contact with a membrane forming coating solution to form a semi-permeable membrane on each side of said strip;
   c. passing the thusly coated strip into a controlled temperature drying zone, thereby forming a resulting strip with spaced, sealed sections;
   d. cutting at least one hole in said strip through the spaced and sealed sections; and
   e. additionally, transversely cutting said elongated strip through the spaced and sealed sections at a spaced distance from any holes therein to provide resulting separate strips each of which has fluid sealing material through the porous filler for both end portions thereof and a fluid passageway hole through one end portion thereof.

2. The continuous method for forming the member of claim 1 further characterized in that said strip is passed through adjustable, movable wiper means upon leaving the coating zone whereby there is a controlled thickness of coating solution retained on each face of said strip to form the desired semi-permeable membrane on each side thereof.

3. The continuous method for forming the member of claim 1 further characterized in that movable impregnation means is provided adjacent the elongated strip of porous filler material and is moved in a manner to correlate with the movement of said porous material whereby the impregnation thereof taken place without stopping the movement of such strip.

4. The continuous method for forming the member of claim 1 further characterized in that a hole cutting means and transverse cutting means are provided to move along with a continuous movement of said strip of porous filler material whereby hole punching and cutting may be carried out without stopping the movement of said strip.

5. The continuous method for forming the member of claim 1 further characterized in that said porous strip is impregnated with a seal material at the spaced sections which is essentially the same material as the membrane forming coating solution whereby there is compatibility between the fluid seal material and the membrane coating material.

6. The continuous method for forming the member of claim 1 further characterized in that the membrane coating solution is a cellulose acetate solution.

* * * * *